United States Patent
Wagner (10) Patent No.: US 10,257,263 B1
(45) Date of Patent: Apr. 9, 2019

(54) SECURE REMOTE EXECUTION OF INFRASTRUCTURE MANAGEMENT

(71) Applicant: Amazon Technologies, Inc., Reno, NV (US)

(72) Inventor: Richard Wagner, Reston, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 15/383,585

(22) Filed: Dec. 19, 2016

(51) Int. Cl.
*G06F 15/173* (2006.01)
*H04L 29/08* (2006.01)
*H04L 12/66* (2006.01)

(52) U.S. Cl.
CPC .......... *H04L 67/1002* (2013.01); *H04L 12/66* (2013.01); *H04L 67/1097* (2013.01)

(58) Field of Classification Search
CPC .. H04L 67/1002; H04L 67/1097; H04L 12/66
USPC ........................................................ 709/226
See application file for complete search history.

(56) References Cited

U.S. PATENT DOCUMENTS

| | | | |
|---|---|---|---|
| 8,813,225 B1* | 8/2014 | Fuller | H04L 63/10 726/23 |
| 9,935,937 B1* | 4/2018 | Potlapally | H04L 63/0823 |
| 2015/0134826 A1* | 5/2015 | Shah | H04L 61/1547 709/226 |

* cited by examiner

*Primary Examiner* — Wing F Chan
*Assistant Examiner* — Joseph R Maniwang
(74) *Attorney, Agent, or Firm* — Hogan Lovells US LLP (57) ABSTRACT

Embodiments provide for the management of resources for an isolated sub-network without use of gateways or other such access mechanisms. A common executor sub-network logically sits between the isolated sub-network and resource provisioning infrastructure, enabling provisioning commands to be executed on behalf of a client in the isolated sub-network. A virtual endpoint enables request objects to be passed to an operations object store of the common executor sub-network. The request object can include information such as a command to be executed and a credential for authorizing the command. An executor service performs the necessary validations and authorizations, and causes the command to be executed on behalf of the client. Upon completion, a response object is provided that includes a result of the execution. The response object includes a limited amount of information, with a full response object being stored by the executor sub-network for auditing or other such purposes.

20 Claims, 6 Drawing Sheets

SECURE REMOTE EXECUTION OF INFRASTRUCTURE MANAGEMENT

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In some instances security restrictions will prevent certain resources or environments from directly accessing provisioning architecture or having access to external network resources. Such restrictions can make it difficult to manage the resources in the isolated environment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments allow for the management of resources for an isolated sub-network without use of gateways or other mechanisms that could potentially allow for unauthorized access to, or from, the isolated sub-network. Various embodiments utilize a common executor sub-network that can logically sit between the isolated sub-network and resource provisioning infrastructure, and can enable commands to be executed by the provisioning infrastructure on behalf of a client in the isolated sub-network. A virtual endpoint can be used to enable request objects to be passed to an operations object store of the common executor sub-network. A request object can include information such as a command to be executed and a credential for authorizing the command to a remote service hosting the provisioning infrastructure. An executor service can analyze the request object to perform the necessary validations and authorizations, and can cause the command to be executed by the provisioning infrastructure on behalf of the client. Upon completion of execution, a response object can be provided for the client that can include a result of the execution. The response object can include a limited amount of information to be passed to the isolated sub-network, with a full response object being stored by the executor sub-network for auditing or other such purposes.

The ability to pass request and response objects via a virtual endpoint prevents the passing of data or the exposing of a gateway with respect to the isolated sub-network. This can be useful in a situation where, for example, security requirements dictate that resources in the isolated sub-network are not to be accessible by external resources, or able to access external resources. Similarly, those requirements might dictate that data cannot be exported to external resources. Such security requirements might be in place for high security environments, such as may relate to governmental agencies or high security research facilities. A high security facility might want to take advantage of the benefits of cloud computing, for example, but still needs to ensure that the appropriate security requirements are satisfied by the cloud resources.

Various other functions can be implemented within the various embodiments as well as discussed and suggested elsewhere herein.

Figure 1:
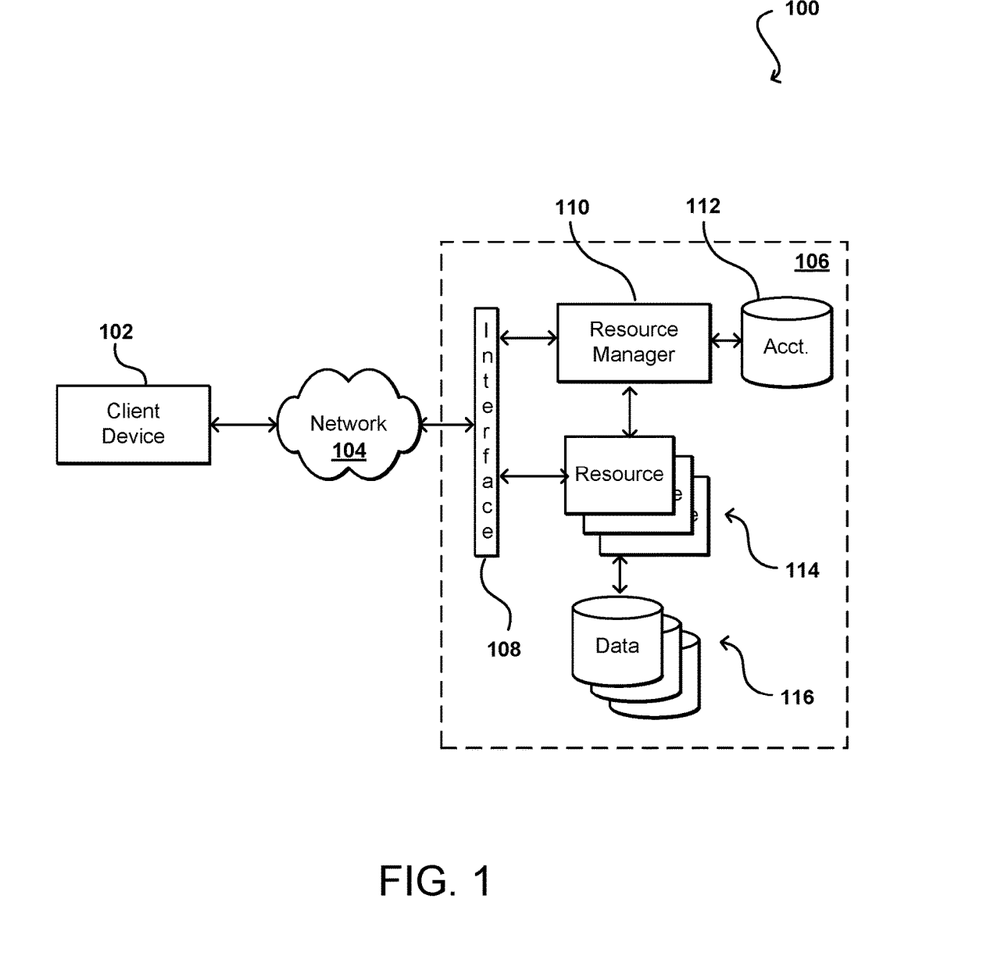
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, there can be various resources allocated to different users or customers of the resource provider environment 106, which for at least some customers can comprise respective sub-networks. These sub-networks can include dedicated resource allocations, specific customer configurations, and dedicated permissions or access policies, among other such aspects. Such a customer may require access to various resource or sub-network provisioning infrastructure, as may include various service endpoints (e.g., APIs), a control console, or a command line interface, among other such options. For specific customer environments, however, the security requirements may disallow direct access to the provisioning infrastructure. These requirements could result from the consumer being an organization separate from the resource provider, or the system originating the requests being on an isolated sub-network that is not permitted to have external access, among other such options. The resources and/or services provided to a restricted sub-network can include, for example, access to both a shared object store service (such as Amazon's AWS Simple Storage Service (S3) service by way of a virtual private cloud (VPC) endpoint) and an authentication service (such as Amazon's AWS Security Token Service (STS)).

Figure 2:
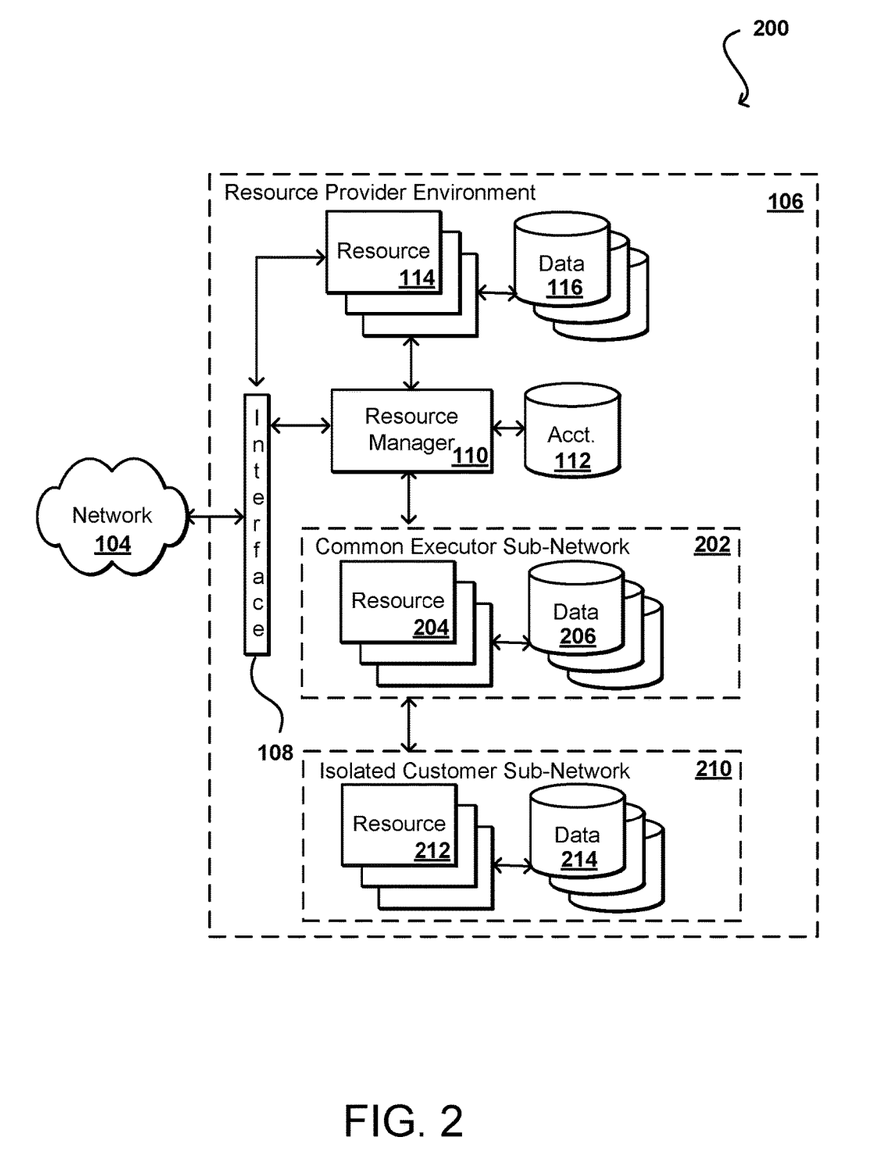
FIG. 2 illustrates an example resource environment for providing remote execution of infrastructure management that can be utilized in accordance with various embodiments.

In order to enable the resources of the isolated customer sub-network to be provisioned and modified while maintaining the required security restrictions, approaches in accordance with various embodiments can provide highly secure, heavily constrained access to provisioning infrastructure of the resource provider environment, authenticated by an authentication service and communicated via an object store. FIG. 2 illustrates an example environment 200 that can be utilized to implement such functionality. In this example, an isolated customer sub-network 210 can include various resources 212 and data stores 214, and accompanying infrastructure and support, to operate within the resource provider environment 106. It should be noted that reference numbers may be carried over between figures for similar elements for simplicity of explanation, but such usage should not be interpreted as a limitation on the scope of the various embodiments unless otherwise specifically stated. In this example, the customer sub-network 210 may want to reconfigure or provision one or more resources 212 or other aspects of the sub-network 210, but may be prevented from directly accessing provisioning infrastructure such as the resource manager 110, a control plane (not shown), or other such systems or services outside the isolated sub-network 210. In this example, however, the isolated customer sub-network 210 can communicate with an intermediary, such as by generating a request object and transmitting the request object through a virtual endpoint as discussed in more detail elsewhere herein. In this example, the intermediary can take the form of a common executor sub-network 202 that can transmit and receive requests and responses on behalf of the isolated customer sub-network 210. In one example, a restricted customer sub-network 210 can generate a request object that contains a request to modify infrastructure for the sub-network, as well as temporary credentials obtained from an authentication service. The request object can be transmitted to the common executor sub-network 202 through a virtual endpoint or other such mechanism, which can validate the request object and cause the requested operation to be performed on behalf of the restricted customer sub-network 210. Once completed, a response object can be generated that can be retrieved by the restricted customer sub-network 210 in order to provide results of the processing.

Figure 3:
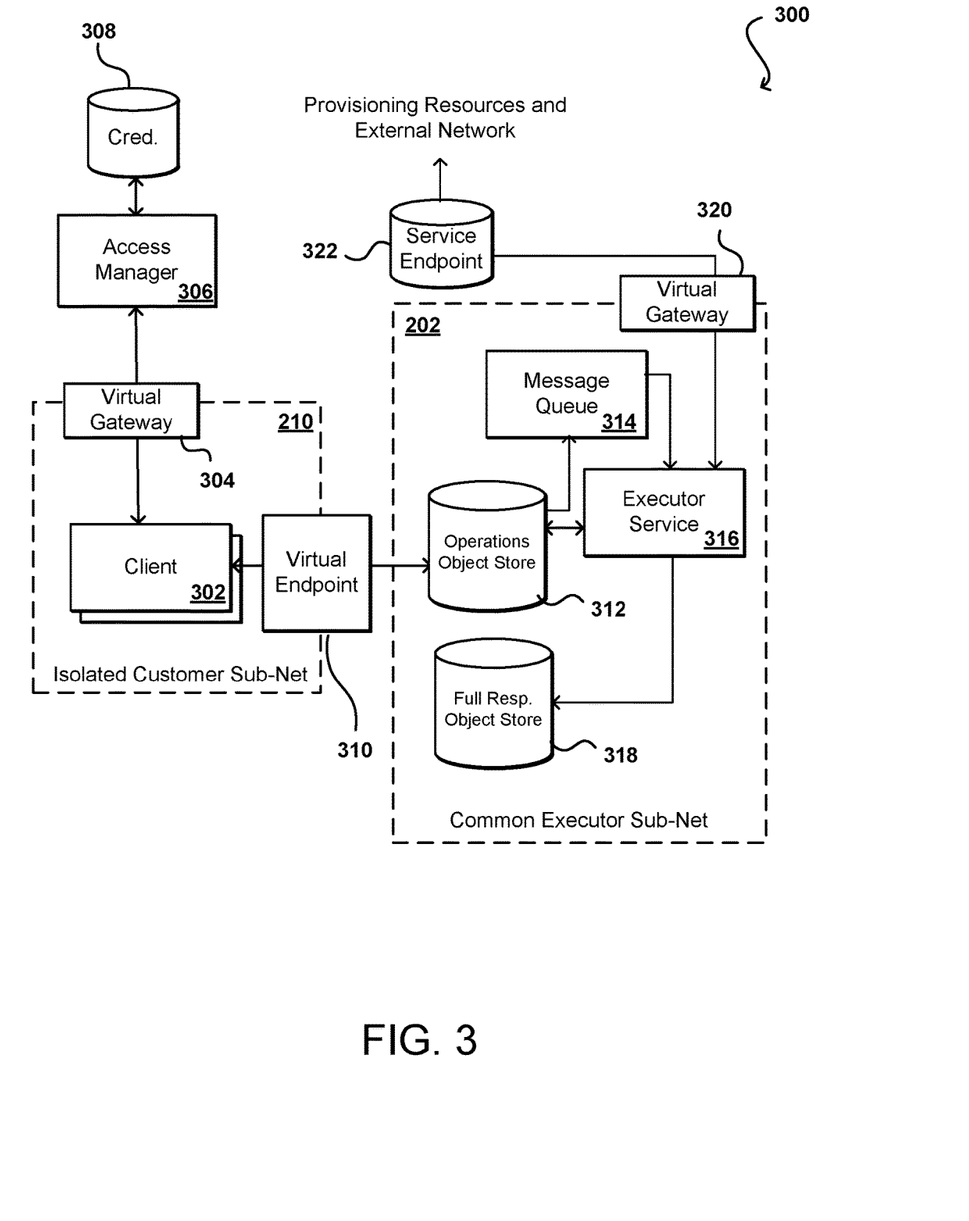
FIG. 3 illustrates example isolated client and executor sub-networks that can be utilized in accordance with various embodiments.

FIG. 3 illustrates an example implementation 300 of an isolated customer sub-network 210 and common executor sub-network 202 that can be utilized in accordance with various embodiments. In this example a client resource 302 executing in the isolated customer sub-network 202 can be provisioned and managed by a resource management service or other system external to the customer sub-network. In order to request modifications, the client resource 302 can submit response objects, or other types of requests, through a virtual endpoint 310, such as a VPC endpoint, to be received to a common executor sub-network 202, or other such intermediary environment. The VPC endpoint is referred to as a "virtual" endpoint because it is not a true endpoint but a virtual interface between the isolated sub-network and the executor sub-network 202. The endpoint is not a gateway or mechanism to any resources outside the respective sub-networks, such that the security requirements remain satisfied while enabling communication between those sub-networks. As mentioned, the virtual endpoint can also enforce strict requirements on the type of information that is able to be passed through the endpoint, and ensure that the information is only passed between the respective sub-networks. In this example the request object, as may include JSON formatted request information, is received to an operations object store 312, which may be offered as part of an object store service or other such component. The operations object store (or other such data store or repository) can be a secured object store that functions as a common point of communication between clients 302 and the executor service 316. The object store is secured at least in part by ensuring that the object store is only able to receive qualifying response objects from a designated isolated sub-network, and transmit qualifying response objects back to that isolated sub-network. Communications using the virtual endpoint are otherwise restricted. The object store service can be configured to place a message in a message queue 314, such as may be offered by the Amazon Simple Queue Service (SQS), upon placement of a request object in the operations object store. This message queue 314 is polled by an executor service 316, or other such system or service, that can obtain the request object from the operations object store 312 and execute the request using the supplied credentials. Executing the request can include, for example, generating a provisioning request for the provisioning infrastructure that causes the provisioning infrastructure to provision a new resource, or modify operation of an already provisioned resource, for the isolated sub-network.

The message queue effectively decouples the request of the client 302 from the processing and response of the executor service 316. The executor service can include any appropriate hardware, software, and configuration useful for processing the messages and causing the corresponding provisioning actions to be performed by the provisioning infrastructure in the resource provider environment. In this example, the executor service 316 uses a virtual gateway 320 to communicate with an endpoint 322 of the provisioning service of the resource provider environment. The use of a virtual gateway enables the deployment manager to specify several settings, such as the type of gateway and encryption to be used for communications passing through the gateway. In some embodiments, each virtual sub-network can have only one virtual gateway per gateway type. The type of gateway selected can also dictate the amount of CPU and network bandwidth allocated for the gateway. The gateway can be used to provide a secure tunnel between the executor sub-network and the provisioning infrastructure, which can limit and/or restrict traffic transmitted across the gateway as discussed or suggested elsewhere herein. A virtual gateway, as used herein, refers to a logical gateway that functions as an actual gateway but can be offered through allocation of a portion of one or more physical resources allocated on behalf of the executor sub-network, with the appropriate configuration and settings for the respective security policies.

The executor service 316 in this example can generate two response objects describing the result of the executed request. One response object can be placed in the operations object store 312 and can include limited data, per the security restrictions, and can be shared with the consumer via the operations object store 312 of the object store. The other response object can contain all provided information relevant to the request and can be stored in a secure location, such as a full response object store 318, for auditing or other such purposes. The operations object store can have a lifecycle policy that causes all objects to be deleted in one day, or another specified period of time.

In such an implementation, the isolated customer sub-network 210 will have no direct access to the provisioning systems or other resources in the "remote untrusted" environment, or those outside the isolated sub-network, such as service endpoint 322 that can be used toi provision or modify resources. It will also not be possible to transmit data into, or out of, the isolated customer sub-network using the virtual endpoint. The customer can work with an access manager 306, or other such system or service, to obtain two sets of credentials for a request. The access manager can be internal or external to the resource provider environment, and can be offered by a third party in at least some embodiments. The client can communicate through a virtual gateway 304 to receive the temporary credentials, a copy of which may be stored locally in a credentials data store 308 or other such repository. A first credential, or set of credentials, can include a customer credential useful by the executor sub-network for validating the request and authenticating the source of the request. A second credential, or set of credentials, can include a remote credential useful by the "remote" resource provider environment provisioning infrastructure to perform the requested action(s) on behalf of the isolated customer sub-network. The credentials can be obtained by the customer and shared in the operations object store 312. In at least some embodiments each client 302 operating in the sub-network will have credentials such as PKI certificates and access to an access manager 306, authentication service, or credential provider. The credentials can be temporary credentials that are only valid for a limited and finite lifetime. The credentials can also be authorized for execution of a limited set of provisioning actions. Placement of the request objects in the operations object store 312 can be constrained by security features of the object store, and ownership of the request and response objects can limit access to the customer placing the request. In the case of a private sub-network, the object store can be accessible via a secure gateway that does not require public access.

The executor service 316 can be fully connected to resources of the resource provider environment, and can be responsible for performing multiple validations, such as to ensure that a message in the message queue 314 is properly formed and refers to a specific request object. The executor service can also validate that the request object is properly formed and contains a request and credentials. It can also be validated that the customer request is not included on a list of globally-disallowed provisioning functions, such as to grant full access, and that no customer response object is generated upon a validation failure, limiting enumeration by a bad actor. The executor service can execute commands on behalf of the client 302, and can create an audit response object in a secure object store, such as the full response object store 318, that contains any or all provided details of all requests. The executor service can place access controls on the object store or operations object store 312, limiting access to response objects to the intended customer. In at least some embodiments the resource provider can provide informational objects, which are similar in form to response objects but are not generated in response to a request object. Such informational objects can be passed to the isolated sub-network through the virtual endpoint in order to pass information to the isolated sub-network, such as may relate to necessary changes in provisioning or other such information. Such information may not otherwise be able to be received to the isolated sub-network due to the lockdown on communications with the sub-network.

Figure 4:
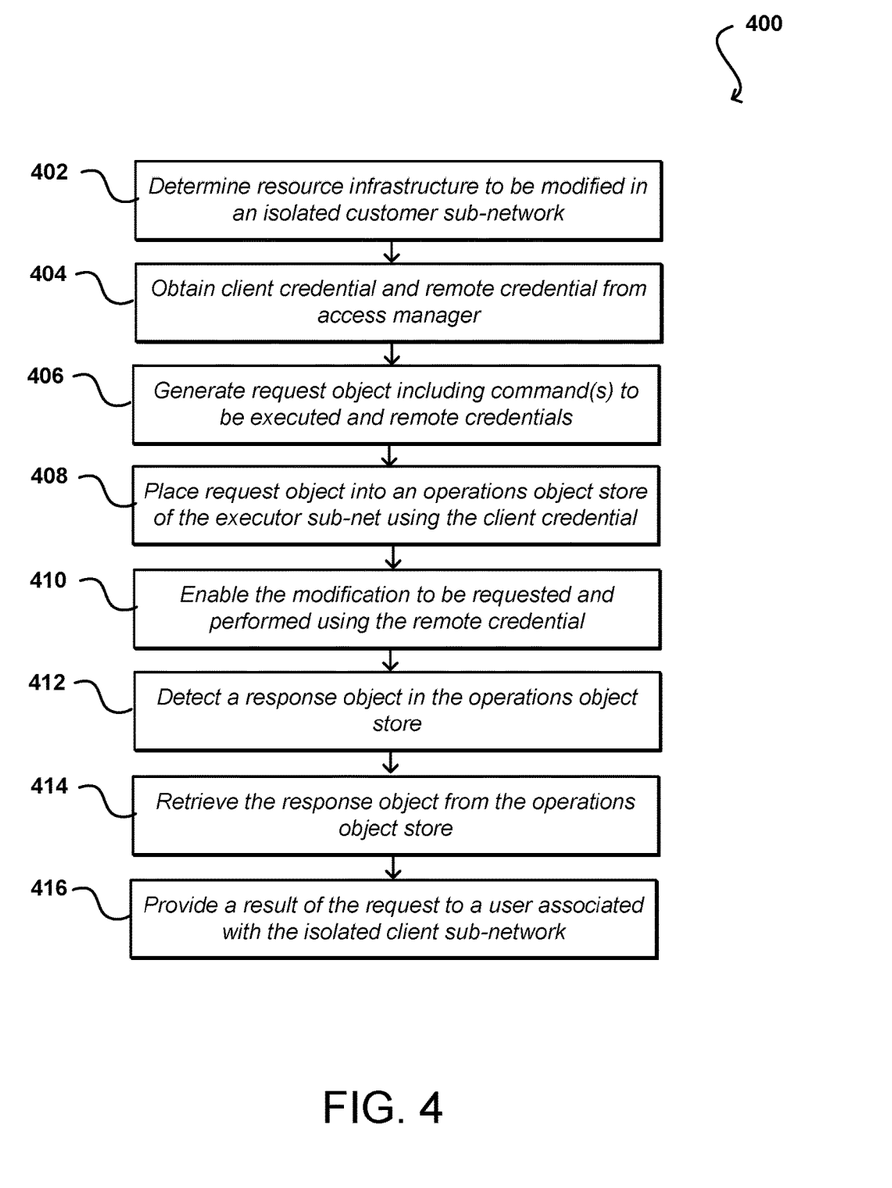
FIG. 4 illustrates an example process for requesting modification of infrastructure for an isolated client sub-network that can be utilized in accordance with various embodiments.

FIG. 4 illustrates an example process 400 for requesting modification of resource infrastructure that can be performed by a client resource of an isolated customer sub-network in accordance with various embodiments. It should be understood for this and other processes discussed herein that there can be additional, alternative, or fewer steps performed in similar or alternative orders, or in parallel, within the scope of the various embodiments unless otherwise stated. In this example, a modification to be made for resource infrastructure in an isolated customer sub-network is determined 402. This can include, for example, provisioning new resources or modifying existing resources in the customer sub-network, among other such options. The client can obtain 404 a client credential and a remote credential from an access manager or other such source. As mentioned, these credentials can be temporary credentials with limited lifetime and functionality, as may be determined by one or more security policies for the isolated customer sub-network. A request object can be generated 406 that includes one or more commands to be executed by the remote provisioning service, or other such components, as well as the remote credentials to be used for the execution. In one embodiment the request object is a JSON-formatted object that includes an identifier for the request, client, or sub-network, as well as remote credentials specific for a role needed to execute the provided command(s). The identifier can be a key based on a client number, such as 000CLIENT000/123b3bc1232213c321a23b3a2b113210. The request object can be placed 408 into an operations object store, or other holding location, of an object service of the executor sub-network using the provided client credential(s). The placing can be performed using a VPC endpoint and the temporary client credential(s), and can provide full permissions to the object store owner. The provided credentials and permission enable 410 the requested operation(s) or modification to be requested and/or performed in the "remote" resource provider environment to modify or provision the resources. Further detail about enabling the requested operations or modifications is provided with respect to FIG. 5 and elsewhere herein. After execution, a response object can be detected 412 in the operations object store, in response to polling the object store or receiving a notification, among other such options. The response object can be retrieved 414 from the operations object store, such as by performing a GET operation using the temporary client credential(s). A result of the request, as specified in the response object, can be provided 416 to the customer for the isolated customer sub-network. As mentioned, the response object may include a limited or type amount of information, such that the result provided may specify only a portion or overview of the actual result(s) obtained.

Figure 5:
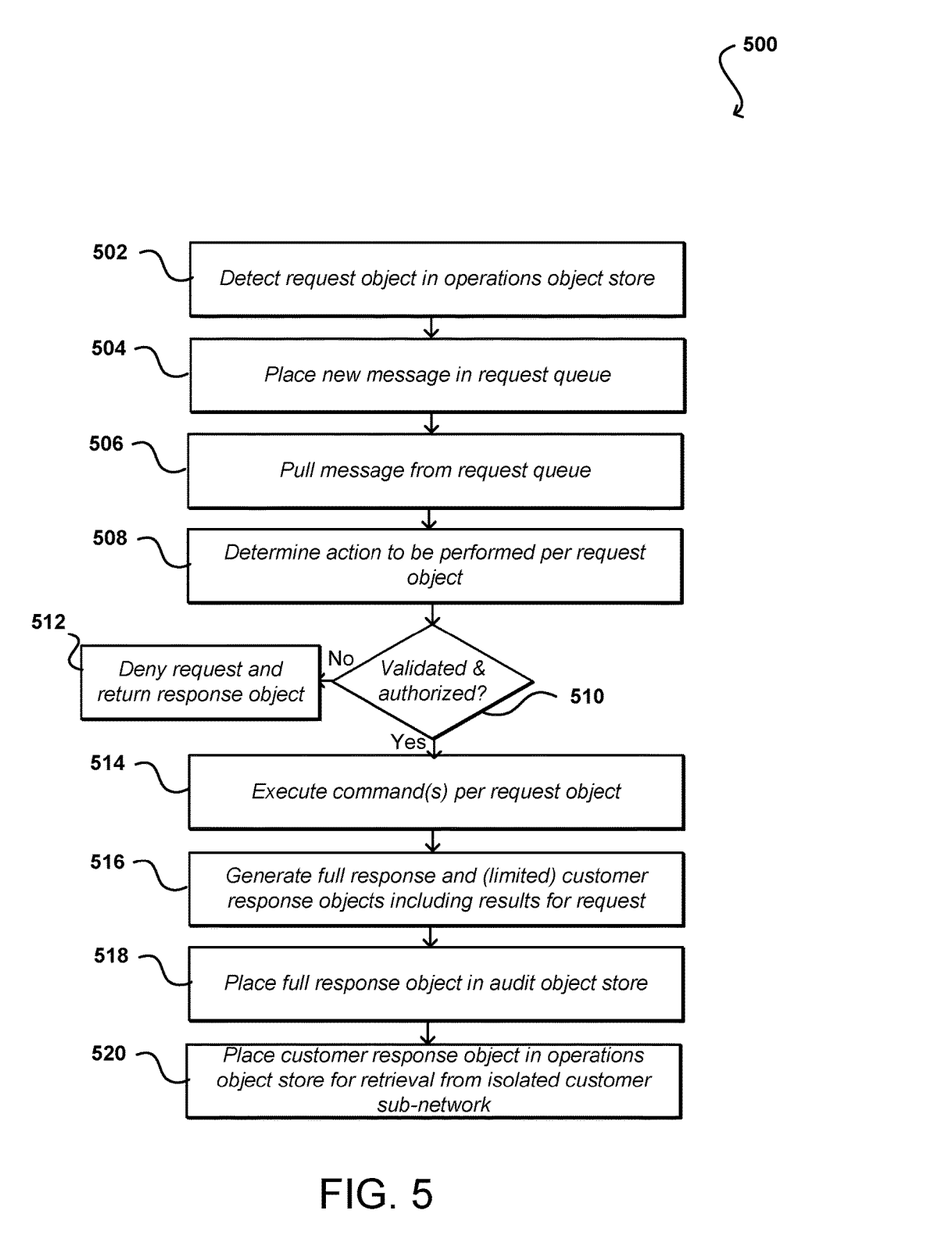
FIG. 5 illustrates an example process for enabling infrastructure for an isolated client sub-network to be modified that can be utilized in accordance with various embodiments.

FIG. 5 illustrates an example process 500 for executing commands on behalf of a client of an isolated customer sub-network that can be utilized in accordance with various embodiments. In at least some embodiments, this process can be performed by a common executor sub-network or other such intermediary. In this example, a request object is detected 502 in an operations object store or other temporary storage repository of an object service or other component of the executor network. The operations object store can be configured with a notification that caused a new message to be placed 504 in a request queue for the executor sub-network. The new message in at least some embodiments can describe the newly placed request object(s). An executor can continuously poll the message queue for new messages, and upon detecting a new message can pull 506 the message from the message queue. In at least some embodiments the messages will be deleted only after processing is completed or it is determined that processing cannot be completed, etc.

In this example the action(s) to be performed on behalf of the restricted client can be determined 508. The action(s) can determine the appropriate validations to be performed, such as may include validating the message in the message queue, obtaining the request object and related permissions, validating the request object, and validating the command to be performed, among other such options. The actions can include actions to, for example, provision a new resource instance, modify operation of a resource instance, or query the status of an existing instance, among other such options. A resource instance as utilized herein can refer to any resource, or portion of a resource, that can be allocated to a customer or other such entity for purposes of performing one or more operations. Examples of resource instances can include physical or virtual servers, virtual machines, containers, databases, load balancers, object stores, block storage, and the like, which are able to store and process data, execute instructions, and/or perform other such operations. The provisioned resources, or modifications, can be executed by the provisioning infrastructure and made available to the isolated sub-network. This can include, for example, setting security and communication settings such that the provisioned resource is only accessible to resources in the isolated sub-network. Information can be passed to the isolated sub-network through a response object, where that information can include information for addressing and utilizing the provisioned resource, as well as capacity or other information relevant for the provisioned resource. As mentioned, a similar mechanism can be used to pass information to the isolated sub-network for any changes to the provisioning, such as when a new physical resource is to be used to provide a virtual resource allocated to the isolated sub-network, etc.

Along with the validations, a response object can begin to be generated that gathers audit information for the request, as may result from the validations. A determination can be made 510 as to whether the validations completed successfully and whether the command is authorized to be performed on behalf of the client. If not, the request can be denied 512 and a response object returned that indicates the failure to execute the command. If any validations, authentications, and/or authorizations are completed successfully, the requested command(s) can be executed 514 per the request object. The execution can utilize the remote credentials for the client, and can capture any relevant output or results that can be added to at least the full response object. A full audit response object and a limited customer response object can be generated 516 or finalized, such as by generating the full audit response object including all relevant information and then copying a specific set of keys or values (as may be determining according to one or more security policies) from the full response object to a client response object as discussed elsewhere herein. The full audit response object can be placed 518 in an audit object store, while the customer response object can then be placed 520 in an operations object store for retrieval from the isolated customer sub-network. The appropriate request object permissions can also be applied to the response object before placement.

Such a system can utilize a variety of different security components, which can be modified to achieve a desired balance between security and operational capability. With respect to the access manager and service endpoint security, network communication can be encrypted using a security protocol such as SSL Transport, and the access manager can authenticate and authorize client requests to assume appropriate identity roles. The service endpoint can interact with the access manager to generate session tokens when roles are assumed, and can authorize assumed role requests based on access policies when interacting with various remote services. With respect to the client, communications can also be encrypted using, for example, SSL transport, and the client can assume both a remote role to authorize remote service commands and a client role to provide granular access control to the shared operations object store. Various security groups and access controls lists can be used to further restrict communication to, and from, a specific client instance. The virtual endpoint can provide access to the respective service without use of an internet gateway or virtual gateway, and can exclude connectivity to other services in the environment. In at least some embodiments the security requirements for the isolated sub-network may prevent the usage of external gateways or other such external access mechanisms.

Communication with the executor can also be encrypted, such as by using SSL Transport. An access role can limit the allowed executor actions to specific queue and service interactions, such as may involve the operations object store and full response object store. Respective object store policies can be managed, such as may permit client interaction with an operations object store only from a virtual endpoint and with respect to a client's specific request and response objects. A object store policy for the full response object store may specify that executors only have put access, while administrators or other authorized parties have full access to perform auditing or other such tasks. A security policy for the message queue might only allow new notifications from named operations object stores, and message manipulation only by executors. In some embodiments an executor sub-network can include a dead letter queue to which undeliverable request queue messages are sent after a number of failed executor processing attempts. In some embodiments the request queue is configured with a re-drive policy that sends undeliverable messages to the dead letter queue. A message may be deemed undeliverable when the message is pulled by an executor a certain number of times without being deleted from the queue.

The system can specify various requirements for accessing the remote service. In one embodiment there are three major categories of S3 access, including client access, executor access, and administrator access. The client access can allow for manipulation of request and response objects only. Executor access can allow for the placing of full response objects and manipulation of request and response objects. Administrator access can allow for accessing full response objects. Access control can be enforced by various components, as may include a virtual endpoint policy as relevant to client access, an operational object store policy, a full response object store policy, request and response object permissions, and access roles. In some embodiments, a client can have permissions to put, get, and delete objects with respect to the operational object store. The client can grant the object store owner full control access to its request objects so that the Executor can process them. The executor should copy response object access controls to request objects, and access should not include list permissions. Restriction of access to the full response object store should be ensured in at least some embodiments. Executor access can be secured at both the object store and object levels. In at least some embodiments the executor has permissions to put, get, and delete objects from the operations object store, and minimal access to the full response object store should be allowed as necessary. The Administrator account(s) should have full access to both the operations object store and the full response object store in at least some embodiments.

Figure 6:
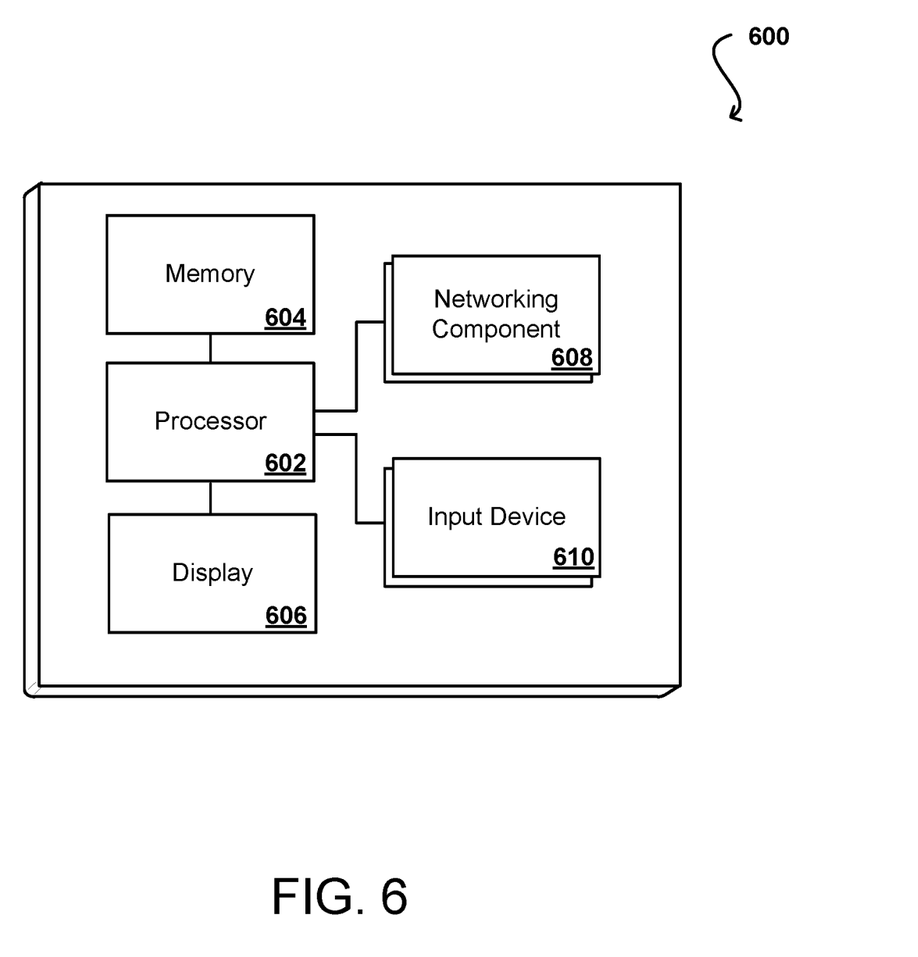
FIG. 6 illustrates example components of a computing device that can be used to implement aspects of the various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a client resource and through a virtual endpoint, a request object to an operations object store, the client resource executing in an isolated customer sub-network of a resource provider environment, the operations object store allocated as part of an executor sub-network of the resource provider environment;
determining, from the request object, a provisioning operation to be performed with respect to the isolated customer sub-network;
validating the provisioning operation using a client credential received with the request object;
causing, by an executor resource of the executor sub-network, the provisioning operation to be executed by one or more provisioning resources in the resource provider environment, the one or more provisioning resources being external to the isolated customer sub-network and the executor sub-network, the one or more provisioning resources being not directly accessible to the isolated customer sub-network, the provisioning operation being performed using a remote credential received with the request object;

receiving, to the executor sub-network, result information for the provisioning operation;

generating an audit response object containing the result information accessible by the executor sub-network;

generating a customer response object including a subset of the result information included in the audit response object; and storing the customer response object to the operations object store, wherein the client resource is enabled to retrieve the customer response object from the operations object store through the virtual endpoint.

2. The computer-implemented method of claim 1, further comprising:

receiving, to the client, the client credential and the remote credential from an access manager through a virtual gateway of the isolated customer sub-network.

3. The computer-implemented method of claim 1, further comprising:

determining at least one security policy for the request object; and ensuring that only data permissible per the at least one security policy is included in the request object, data not permitted by the at least one security policy being unable to be transmitted to, or from, the isolated customer sub-network.

4. The computer-implemented method of claim 1, further comprising:

enforcing one or more security restrictions preventing the isolated customer sub-network from accessing an external network.

5. The computer-implemented method of claim 1, further comprising:

validating that the provisioning operation is permissible for performance with respect to the isolated customer network according to one or more security restrictions.

6. A computer-implemented method, comprising:

receiving a request object to an operations object store of an executor sub-network of a resource provider environment, the request object including a request to perform a modification of resources in an isolated sub-network of the resource provider environment, the request object received via a virtual endpoint of the isolated sub-network;

causing, by the executor sub-network, the modification to be executed by one or more services of the resource provider environment, the one or more services being external to the isolated sub-network and the executor sub-network, the one or more services being not directly accessible to the isolated customer sub-network;

generating a response object including result information permissible according to at least one security restriction for the isolated sub-network; and placing the response object in the operations object store for retrieval through the virtual endpoint to the isolated sub-network.

7. The computer-implemented method of claim 6, further comprising:

causing a request message, corresponding to the request object, to be placed in a message queue of the executor sub-network;

polling the message queue by an executor service of the executor sub-network; and pulling the request message from the message queue to the executor service before validating the request.

8. The computer-implemented method of claim 6, wherein the modification includes at least one of provisioning a new resource, modifying operation of an already provisioned resource, or obtaining status information for the already provisioned resource.

9. The computer-implemented method of claim 6, further comprising:

receiving a client credential and a remote credential from an access manager through a virtual gateway of the isolated sub-network, the client credential indicating permission to process the request object in the executor sub-network, the remote credential indicating permission to execute the modification using the one or more services of the resource provider environment.

10. The computer-implemented method of claim 9, wherein the client credential and the remote credential are temporary credentials with respective limited lifetimes and respective access permissions as specified by at least one access control policy for the isolated environment.

11. The computer-implemented method of claim 6, wherein the one or more services provide at least one of a service endpoint, a control console, or a command line interface.

12. The computer-implemented method of claim 6, further comprising:

generating an audit response object containing a superset of the result information, the audit response object being inaccessible to the isolated customer sub-network; and generating the response object, accessible to the isolated sub-network, including the result information.

13. The computer-implemented method of claim 6, further comprising:

enforcing one or more security restrictions preventing the isolated sub-network from accessing an external network.

14. The computer-implemented method of claim 6, further comprising:

validating that the modification is permissible for performance with respect to the isolated network according to one or more security restrictions.

15. A system, comprising:

at least one processor; and memory including instructions that, when executed by the at least one processor, cause the system to:

receive a request object to an operations object store of an executor sub-network of a resource provider environment, the request object including a request to perform a modification of resources in an isolated sub-network of the resource provider environment, the request object received via a virtual endpoint of the isolated sub-network;

cause, by the executor sub-network, the modification to be executed by one or more services of the resource provider environment, the one or more services being external to the isolated sub-network and the executor sub-network, the one or more services being not directly accessible to the isolated customer sub-network, the modification being performed using a remote credential received with the request object;

generate a response object including result information permissible according to at least one security restriction for the isolated sub-network; and placing the response object in the operations object store for retrieval through the virtual endpoint to the isolated sub-network.

16. The system of claim 15, wherein the instructions when executed further cause the system to:
cause a request message, corresponding to the request object, to be placed in a message queue of the executor sub-network;
poll the message queue by an executor service of the executor sub-network; and
pull the request message from the message queue to the executor service before validating the request.

17. The system of claim 15, wherein the instructions when executed further cause the system to
receive a client credential and a remote credential from an access manager through a virtual gateway of the isolated sub-network, the client credential indicating permission to process the request object in the executor sub-network, the remote credential indicating permission to execute the modification using the one or more services of the resource provider environment, wherein the client credential and the remote credential are temporary credentials with respective limited lifetimes and respective access permissions as specified by at least one access control policy for the isolated environment.

18. The system of claim 15, wherein the instructions when executed further cause the system to:
generate an audit response object containing a superset of the result information, the audit response object being inaccessible to the isolated customer sub-network; and
generate the response, accessible to the isolated sub-network, including the result information.

19. The system of claim 15, wherein the instructions when executed further cause the system to:
enforce one or more security restrictions preventing the isolated sub-network from accessing an external network.

20. The system of claim 15, wherein the instructions when executed further cause the system to:
validate that the modification is permissible for performance with respect to the isolated network according to one or more security restrictions.

* * * * *